Feb. 9, 1971  HANS-KARL WEINLEIN  3,561,080
CERAMIC KILNS

Filed July 25, 1968  3 Sheets-Sheet 1

INVENTOR
HANS-KARL WEINLEIN
BY
Mason, Mason & Albright
ATTORNEYS

Feb. 9, 1971 HANS-KARL WEINLEIN 3,561,080
CERAMIC KILNS
Filed July 25, 1968 3 Sheets-Sheet 3

INVENTOR
HANS-KARL WEINLEIN
BY
ATTORNEYS

United States Patent Office 3,561,080
Patented Feb. 9, 1971

3,561,080
CERAMIC KILNS
Hans-Karl Weinlein, Ibbenburen, Germany, assignor to Keller Ofenbau G.m.b.H., Laggenbeck, Westphalia, Germany, a joint-stock company of Germany
Filed July 25, 1968, Ser. No. 747,580
Claims priority, application Germany, Apr. 18, 1968,
P 17 58 180.5
Int. Cl. F27b 9/10
U.S. Cl. 25—142                     2 Claims

ABSTRACT OF THE DISCLOSURE

A tunnel ceramics kiln has openings so arranged that when gaps between cars carrying ceramic ware to be fired are aligned with the openings, aprons are moved into the gaps to assist in deflecting hot gases into the openings. The aprons may be of differing lengths and in one embodiment a single apron is used with apertures therein.

BACKGROUND OF THE INVENTION

The invention relates to a kiln for the ceramics industry, and more particularly a tunnel kiln for heavy ceramic ware, in the firing zone of which cars loaded with the ceramic ware to be fired are placed and in which the kiln gases and the like are evacuated through at least one fire gap situated between two adjacent groups of ceramic ware.

A tunnel kiln arrangement for introducing kiln gases to the kiln tunnel and extracting them therefrom has already been proposed. This consists in its essentials of the door fitted at the charging end of the tunnel kiln, which door, in this known design, is of hollow box construction and contains openings for the passage of kiln gases in the portion facing both the kiln bottom and the firing zone. This hollow kiln door is connected by pipes to an extraction fan, which draws off the gases flowing into the door.

Because of the construction of this prior proposal, the extraction fan has to be switched off initially during the forward feed sequence. Another drawback of the prior proposal is that the kiln door is necessarily of rather heavy, complicated construction and, even so, affords no guarantee that the flue gases will be properly extracted across the entire kiln cross-section, since the temperature is raised in the gaps at the sides or crown of the kiln, so that temperature differences arise within the grouped ware.

The object of the invention is to provide a kiln in which axial extraction of flue gases over the entire kiln cross-section is possible, without lateral diversion of flow and without the temperature becoming excessive in the gaps at the sides or overhead, and in which there is no risk of creating a wedge of ceramic ware through which the hot gas flow is poor.

SUMMARY OF THE INVENTION

By the provision of aprons that can be introduced into the fire gaps the flue gases can be deflected from the firing zone. The primary advantage of this is that the flow through the ceramic ware being fired is entirely axial, so that acceleration of the flue gases and hence a rise of temperature in the gaps at the sides and overhead are avoided, with the result that the temperature within the batches of ceramic ware becomes more uniform.

As the aprons are fitted in the firing zone in such a way that they can be moved, they can be adjusted during the forward feed sequence, so that they do not obstruct the advance of the cars in the kiln.

In one practical embodiment in accordance with the invention, with a single apron that can be introduced into a fire gap, this apron is provided with apertures to permit the passage of flue gases and the like. Since the free cross-section is blocked by the apron, apertures being left only for the passage of the flue gases, these are compelled, while still warm or hot, to flow through the batches of ceramic ware on the cars newly run in and to pre-heat it.

In a modification, the apron is made in two parts, both of which lie in one and the same plane. This kind of apron is of special advantage in a kiln of particularly wide cross-section, because, here again, the flue gases are drawn axially through the ceramic ware.

Where there are several aprons that can be introduced into the fire gap, these are mounted parallel to one another and differ in length. These parallel aprons of varying lengths enable the stream of flue gases to be divided into horizontal or vertical layers, to ensure that the gases flow evenly over the entire cross-section of the tunnel kiln, so that all points in the ware are heated uniformly.

With this arrangement, it is preferably possible to close off the passages between the individual aprons. By the closing-off of particular passages between the aprons, the suction of the flue gases can be regulated so that these flow through the lower portion of the zone charged with ceramic ware.

DESCRIPTION OF THE PREFERRED EMBODIMENTS

Figure 1:
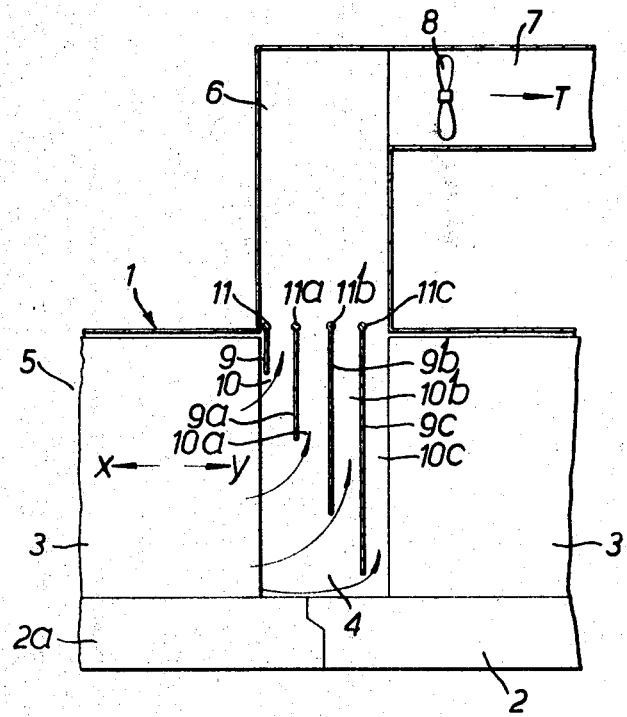
FIG. 1 is a vertical section, of the charging end, of one embodiment of a kiln in accordance with the invention.

The reference numeral 1 has been used to designate a tunnel kiln, only the charging end of which is shown in the drawings. Cars 2 and 2a can be run along the length of this tunnel kiln.

The cars 2 and 2a carry the ceramic ware that is to be fired, such as bricks, for example. Between the charges 3, fire gaps 4 are provided, these normally being situated below vent holes, not shown in the drawings.

The loading flats of the cars interlock and seal off the firing zone form a passage running lengthwise below the tunnel kiln 1 and hence from the atmosphere.

The direction of advance of the cars 2 and 2a is indicated by the arrow x, while the flue gases or the like are drawn off in the opposite direction indicated by arrow y, towards the charging end of the tunnel fliln 1.

As can be seen from FIG. 1, for example, adjacent the charging end, that is to say at a short distance from the charging door, there is an extraction chamber 6, substantially rectangular in cross-section, which extends right across the width of the tunnel kiln 1 and which opens into one or more extraction pipes 7. An extraction fan 8 serves to draw off the flue gases or the like from the extraction chamber 6, in the direction indicated by an arrow T.

The members 9, 9a, 9b and 9c are aprons, by which the flue gases drawn out are directed in separate layers through passages 10, 10a, 10b and 10c into the extraction chamber 6. These aprons 9 to 9c are movable, so that they can be withdrawn into the extraction chamber 6 as the cars 2 and 2a are being moved in the direction indicated by arrow x, so as not to obstruct the movement of these cars.

The passages 10 to 10c can be closed by means of dampers, 11, 11a, 11b and 11c. In this way, it is possible to draw off the flue gases at various levels in the tunnel kiln 1.

The aprons 9 to 9c are fitted in such a way that they can be introduced into the fire gap 4 between the charge points 3 or withdrawn into the extraction chamber 6.

Figure 2:
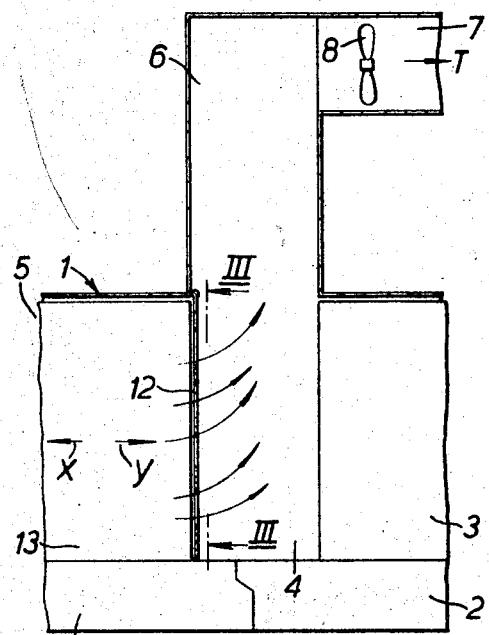
FIG. 2 is a vertical section of the charging end of another embodiment.
Figure 3:
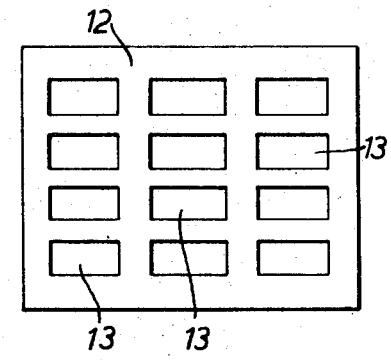
FIG. 3 is a vertical section along the line III—III of FIG. 2.

Another embodiment is shown in FIG. 2. Here, instead of four aprons, there is only a single apron 12, containing apertures 13, through which the flue gases and the like are drawn off, the low pressure in the fire gap 4 and in the extraction chamber 6 causing the gases that pass through the apertures 13 in the apron 12 to be divided up into a number of separate streams. This apron 12 can likewise be introduced into the fire gap 4 or can be raised into the extraction chamber 6 while the cars 2 and 2a are being moved.

Figure 4:
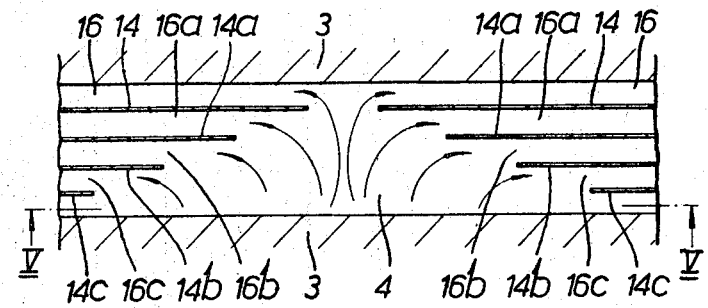
FIG. 4 is a plan of the charging end of a third embodiment.
Figure 5:
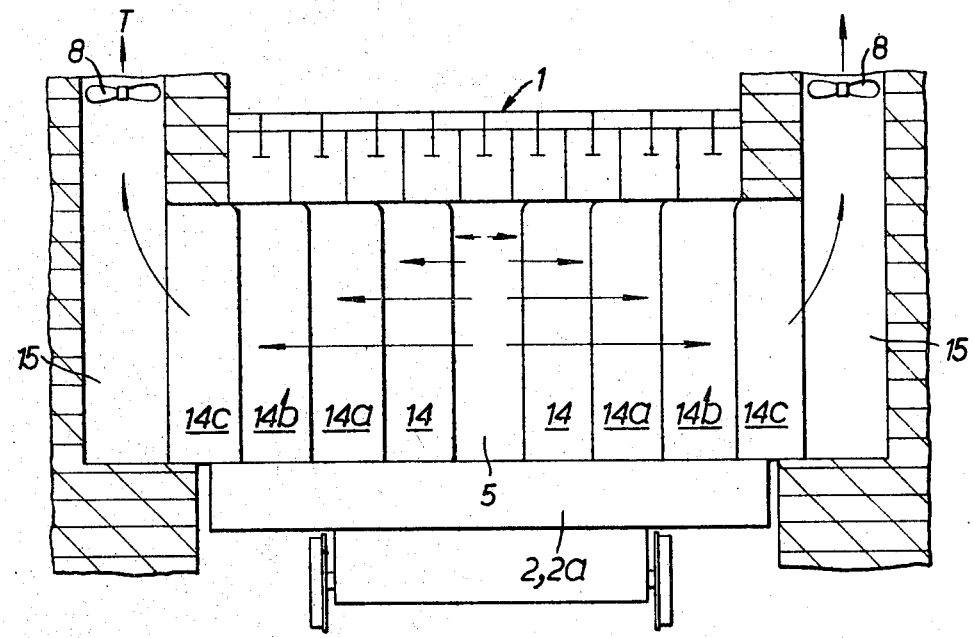
FIG. 5 is a vertical section along the line V—V of FIG. 4.

FIGS. 4 and 5 illustrate a further embodiment, in which aprons 14, 14a, 14b and 14c are fitted vertically and can be introduced into extraction chambers situated laterally of the firing zone 5 of the kiln. The volume of flue gases drawn off can be regulated by the passages 16, 16a, 16b and 16c between the various aprons 14, 14a, 14b and 14c, as well as by the use of dampers not shown in FIGS. 4 and 5.

Figure 6:
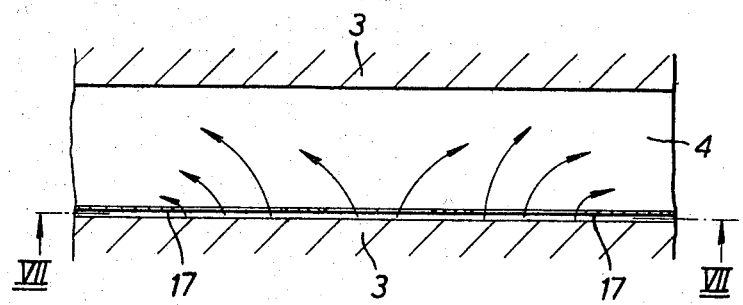
FIG. 6 is a plan of the charging end of a fourth embodiment.
Figure 7:
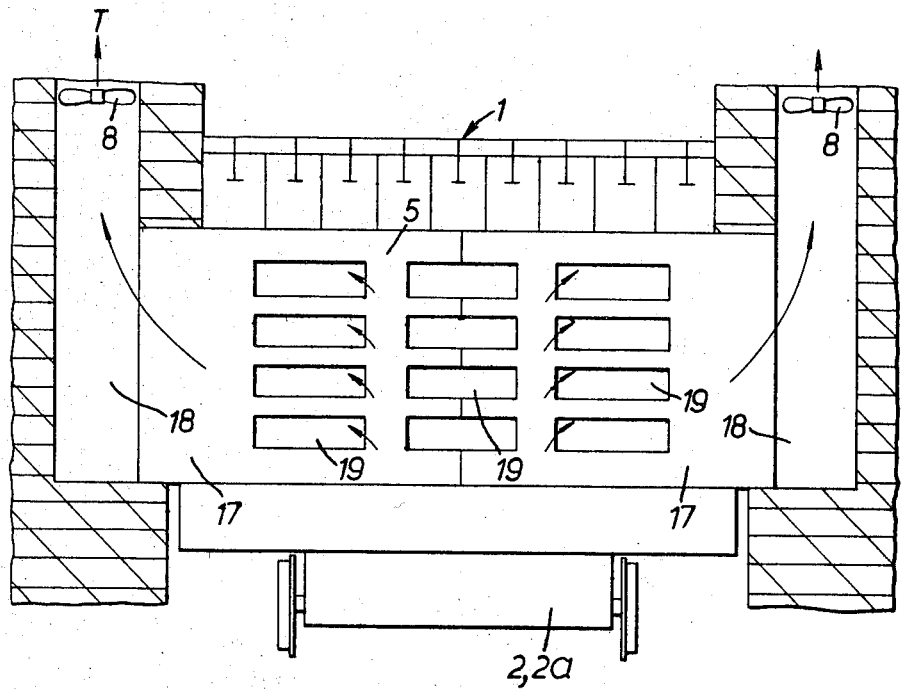
FIG. 7 is a vertical section along the line VII—VII of FIG. 6.

A final embodiment is illustrated in FIGS. 6 and 7. Here, the apron 17 is made in two parts, both lying in the same plane. Thus, each of the members of the apron can be introduced into an extraction chamber 18, connected to the firing zone 5 at the side. The apron 17 contains extraction apertures 19, through which the flue gases and the like can be drawn off at each side, in the directions indicated by arrows T, by an extraction fan 8, fitted in the extraction chamber 18.

I claim:
1. In a ceramics kiln
   means defining a firing zone, into which cars loaded with the ceramic ware to be fired can be moved,
   means defining a fire gap for the removal of combustion gases,
   the improvement comprising
      means defining a first gas-extraction chamber situated laterally of one side of the fire gap,
      means defining a second gas-extraction chamber situated laterally of the other side of the fire gap,
      a first set of aprons movable into and out of the first gas extraction chamber,
      a second set of aprons movable into and out of the second gas extraction chamber, and
      means for introducing the aprons to and retracting them from the respective gas extraction chambers
   the aprons of each set lying parallel to one another and each apron being of a different length relative to other aprons of that set.
2. A kiln according to claim 1, comprising
   dampers, and
   means to move the dampers to close the passages between the aprons.

References Cited
UNITED STATES PATENTS
2,975,499   3/1961   Lapp _____ 25—142X
3,108,351   10/1963  Hermans _____ 25—142

FOREIGN PATENTS
1,166,081   3/1964   Germany.

J. SPENCER OVERHOLSER, Primary Examiner
L. R. FRYE, Assistant Examiner